United States Patent
Watanabe

(10) Patent No.: US 7,515,980 B2
(45) Date of Patent: Apr. 7, 2009

(54) SOUND OUTPUTTING APPARATUS AND SOUND OUTPUTTING METHOD

(75) Inventor: Akira Watanabe, Hanno (JP)

(73) Assignee: Casio Hitachi Mobile Communications Co., Ltd., Higashiyamato (JP)

(*) Notice: Subject to any disclaimer, the term of this patent is extended or adjusted under 35 U.S.C. 154(b) by 491 days.

(21) Appl. No.: 11/444,795

(22) Filed: May 31, 2006

(65) Prior Publication Data

US 2007/0026844 A1 Feb. 1, 2007

(30) Foreign Application Priority Data

Jun. 1, 2005 (JP) .............................. 2005-161105

(51) Int. Cl.
*G06F 17/00* (2006.01)
*H04B 1/38* (2006.01)
(52) U.S. Cl. .......................................... 700/94; 455/567
(58) Field of Classification Search ..................... 700/94; 455/567; 379/372, 373.01, 374, 375.01
See application file for complete search history.

(56) References Cited

U.S. PATENT DOCUMENTS

2006/0258408 A1* 11/2006 Tuomela et al. .......... 455/569.1

FOREIGN PATENT DOCUMENTS

| JP | 05-235830 | 9/1993 |
|---|---|---|
| JP | 2000-358085 | 12/2000 |
| JP | 2001-203787 | 7/2001 |
| JP | 2001-257030 | 9/2001 |
| JP | 2002-033790 | 1/2002 |
| JP | 2002-109610 | 4/2002 |
| JP | 2004-080395 | 3/2004 |

OTHER PUBLICATIONS

Office Action dated Aug. 14, 2007 (with English translation) issued for the counterpart Japanese Patent Application No. 2005-161105 (4 pgs.).

* cited by examiner

*Primary Examiner*—Walter F Briney, III
(74) *Attorney, Agent, or Firm*—Cohen Pontani Lieberman & Pavane LLP

(57) ABSTRACT

A controller of a handy terminal such as a cellular phone determines whether a headphone is connected or not when discriminating that reproduction output of sound data ends. With the headphone connected, the controller stores an end time in a time memory. When reproduction output of sound data is necessary, the controller determines whether or not a predetermined time has passed after the stored end time. When the controller detects that the predetermined time has passed, the controller changes the output destination of sound data from the headphone to a speaker for generation of a sound therefrom.

22 Claims, 14 Drawing Sheets

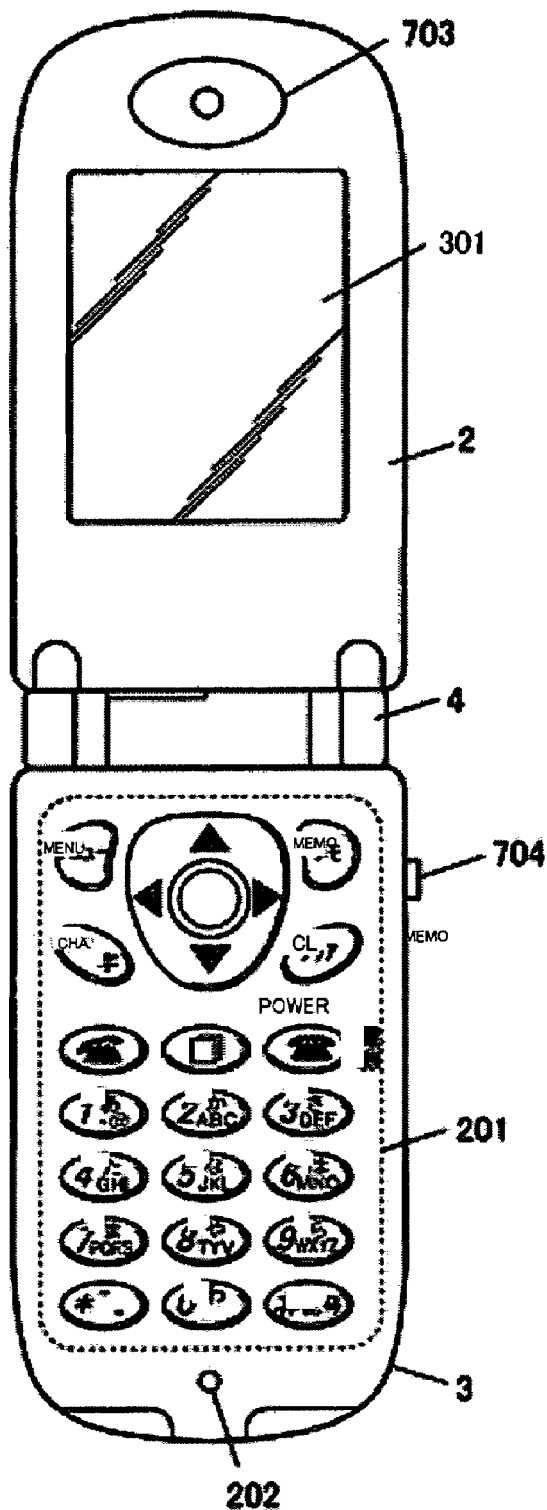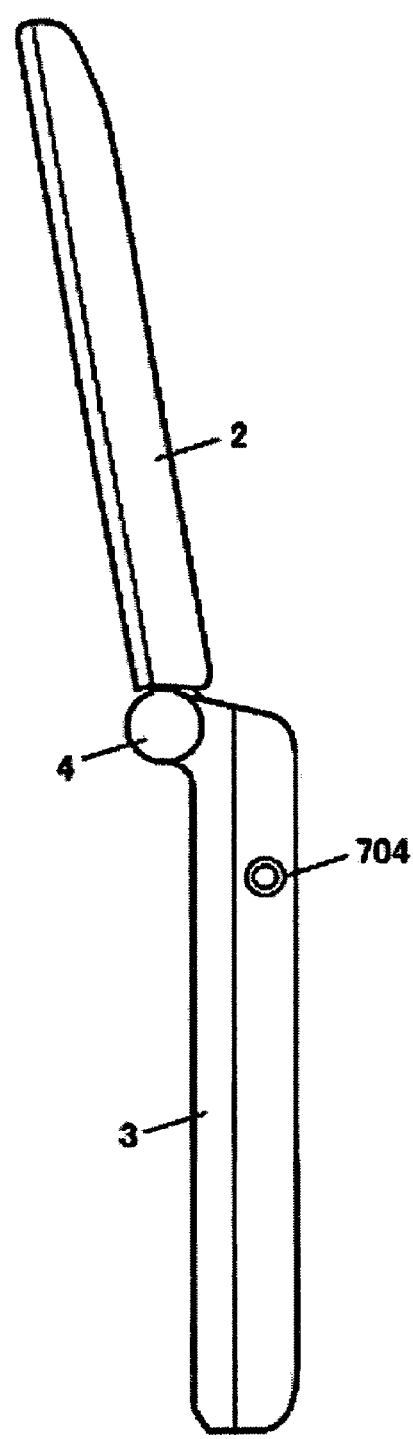
FIG.1AFIG.1B

SOUND OUTPUTTING APPARATUS AND SOUND OUTPUTTING METHOD

BACKGROUND OF THE INVENTION

1. Field of the Invention

The present invention relates to a sound outputting apparatus and a sound outputting method, which output sound.

2. Description of the Related Art

Many of recent cellular phones have a speaker and an earphone terminal, and have a music playback capability or the like as well as a telephone capability. Such a cellular phone supplies sound data to an earphone when the earphone is connected to the earphone terminal, and supplies sound data to the speaker when no earphone is connected to the earphone terminal.

Cellular phones give a ring sound (ring notification sound or tone) to inform an incoming call or reception of a mail. Some cellular phones have an alarm function to generate a sound at a preset time to notify a user of the time. Those informing sounds are likewise sent to an earphone when the earphone is connected to the earphone terminal, and sent to the speaker with no earphone connected to the earphone terminal.

In case of notifying a user of something by generating a notification sound, the conventional cellular phones give sound notification according to the use mode of a speaker or an earphone. Therefore, the user can recognize a notification sound without changing the use mode.

As earphone users are increasing recently, various technologies for earphone use have been developed.

For example, Japanese Patent Laid-Open Publication No. 2001-203787 discloses a technology of allowing for user talking when receiving an incoming call while playing music and making a call from a head set including a microphone and a headphone.

Japanese Patent Laid-Open Publication No. 2004-80395 discloses a technology of notifying an incoming call by vibration of a vibrator while listening to a piece of music played back through an earphone or a headphone.

A sound output from an earphone (including a headphone) is considerably smaller than a sound output from a speaker. Therefore, when a user enjoys music using the earphone and then the user leaves the cellular phone as it is, a ring sound to inform incoming call or an alarm sound of a scheduler and an alarm are do not output from the speaker because the earphone is still connected to the cellular phone. That is, the user cannot be adequately notified of necessary information. The means for solving the these problem are not disclosed in the prior arts.

A similar problem also occurs on devices which have plural types of sound output means, as well as cellular phones.

SUMMARY OF THE INVENTION

Accordingly, it is an object of the invention to provide a voice output apparatus and a voice output method which can allow a user to listen to an output sound even when the user leaves a device with an earphone or the like connected thereto behind.

It is another object of the invention to provide a voice output apparatus and a voice output method which can adequately send voice information to a user.

To achieve the objects, according to the first aspect of the invention, there is provided a sound output apparatus comprising:

a sound data storing section which stores sound data;

a reading section which reads out the sound data from the sound data storing section;

an operating section which is operable by a user, detects the use's operation and outputs an operation signal;

a first control section which controls the reading section to read out the sound data from the sound data storing section and to output the read sound data through a predetermined first path, in response to the operation signal;

a first output section which outputs sound based on the read sound data supplied through the first path;

an end-timing memorizing section which memorizes timing data representing a timing at which the output of the sound data by the first control section ends;

a first determining section which determines whether or not a predetermined time period has passed from the output end timing;

a second control section which controls the reading section to read out the sound data from the sound data storing section and outputs the read sound data through a predetermined second path different from the first path when the first determining section determines that the predetermined time period has passed; and a second output section which outputs sound based on the sound data supplied through the second path.

The sound output apparatus may further comprise an amplifying section which amplifies the sound data; a second determining section which determines whether the sound data is to be output by the first control section or the second control section; and an amplifying control section which controls an amplifying factor of the amplifying section based on the determination of the second determining section.

The sound output apparatus may further comprise a light detecting section which detects an intensity of ambient light of this sound output apparatus, wherein the second determining section determines whether the sound data is to be output by the first control section or the second control section, based on the light detecting section.

The sound output apparatus may further comprise a connection detecting section which detects connection between this sound output apparatus and an external apparatus, wherein the second determining section determines that the sound data is to be output by the second control section when the connection detecting section detects that this sound output apparatus is connected to the external apparatus.

The sound output apparatus may further comprise a call detecting section which detects an incoming call from an external apparatus, wherein the second determining section determines that the sound data is to be output by the second control section when the call detecting section detects the incoming call.

The sound output apparatus may further comprise a response detecting section which detects a predetermined response to the incoming call detected by the call detecting section, and a stop control section which stops the reading section reading the sound data from the sound data storing section.

The sound output apparatus may further comprise a voice input section which inputs voice signal, and a comparing section which compares information based on the input voice signal with preset information, wherein the stop control section stops the reading section reading the sound data from the sound data storing section based on the comparison result of the comparing section.

The sound output apparatus may further comprise a response detecting section which detects a predetermined response to the incoming call detected by the detecting section, a receiving section which receives data following to the incoming call when the response detecting section detects the response, and a third control section which controls the second output section to output voice based on the data received by the receiving section.

The sound output apparatus may further comprise an editing section which edits the predetermined time period to be use in determination by the first determination section.

The first determining section may determine whether or not the operating section outputs the operation signal during the predetermined time period from the output end timing. In this case, the second control section may control the reading section to read out the sound data from the sound data storing section and to output the read sound data through the second path when the first determining section determines that the operating section output the operation signal during the predetermined time period from the output end timing.

To achieve the objects, according to the second aspect of the invention, there is provided a sound output method comprising:

a sound data storing step of storing sound data;

a reading step of reading out the sound data stored in the sound data storing step;

a first control step of controlling the sound data read out in the reading step so as to be output through a predetermined first pain in response to the operation signal output from an operation section;

a first output step of outputting sound based on the sound data output in the first control step;

a memorizing step of memorizing a timing at which the output of the sound data by the first output step ends;

a first determining step of determining whether or not a predetermined time period has passed from the output end timing;

a second control step of controlling the sound data read out in the reading step so as to be output through a predetermined second path other than the first path when the first determining step determines that the predetermined time period has passed from the output end timing.

The sound output method may further comprise an amplifying step of amplifying the sound data; a second determining step of determining whether the sound data is to be output in the first control step or the second control step; and an amplifying control step of controlling the amplifying factor of the amplification in the amplifying step based on the determination of the second determining step.

The sound output method may further comprise a light detecting step of detecting an intensity of ambient light, wherein the second determining step determines whether the sound data is to be output by the first control step or the second control step, based on the detection result in the light detecting step.

The sound output method may further comprise a connection detecting step of detecting connection to an external apparatus, wherein the second determining step determines that the sound data is to be output in the second control step when the connection to the external apparatus is detected in the connection detecting step.

The sound output method may further comprise a call detecting step of detecting an incoming call from an external apparatus, wherein the second determining step determines that the sound data is to be output in the second control step when the connection detecting step detects the incoming call.

The sound output method may further comprise a response detecting step of detecting a predetermined response to the incoming call detected in the call detecting step, and a stop control step of stopping the reading step reading out the sound data.

The sound output method may further comprise a voice input step of inputting voice signal, and a comparing step of comparing information based on the input voice signal with preset information, wherein the stop control step stops the reading of the sound data based on the comparison result.

The sound output method may further comprise a response detecting step of detecting a predetermined response to the incoming call detected in the detection step; a receiving step of receiving data following to the incoming call when the response detecting step detects the predetermined response, and a third control step of controlling the second output step to output voce based on the signal received in the receiving step.

The sound output method may further comprise the editing step of editing the predetermined time to be use in determination in the first determination step.

The first determining step may determine whether or not the operation signal is output from the operation section during the predetermined time period from the output end timing. In this case, the second control step outputs, through the second path, the sound data read out in the reading step when the first determining step determines that the operation signal is output from the operation section during the predetermined time period from the output end timing.

To achieve the objects, according to the third aspect of the invention, there is provided a computer readable recording medium storing a program for controlling a computer having a first output section, a second output section, and an operation unit as:

sound data storing means for storing sound data;

reading means for reading out the sound data from the sound data storing means;

operating means for detecting use's operation and outputting an operation signal;

first control means for controlling the reading means to read out the sound data from the sound data storing means and to output the read sound data through a predetermined first path in response to the operation signal;

first output means for outputting sound base on the read out data supplied through the predetermined first path;

end-timing memorizing means which memorizes timing data representing a timing at which the output of the sound data by the first control means ends;

first determining means which determines whether or not a predetermined period has passed from the output end timing;

second control means for controlling the reading means to read out the sound data from the sound data storing means and to output the read sound data through a second path different from the first path; and second output means for outputting sound based on the sound data supplied through the second path.

To achieve the objects, according to the fourth aspect of the invention, there is provided a sound output apparatus comprising:

sound data storing means for storing sound data;

reading means for reading out the sound data from the sound data storing means;

operating means for detecting use's operation and outputting an operation signal;

first control means for controlling the reading means to read out the sound data from the sound data storing means and to output the read sound data through a predetermined first path in response to the operation signal;

first output means for outputting sound based on the read sound data supplied trough the first path;

end-timing memorizing means for memorizing timing data representing a timing at which the output of the sound data by the first output means ends;

first determining means for determining whether or not a predetermined time period has passed from the output end timing;

second control means for controlling the reading means to read out the sound data from the sound data storing means and outputting the read sound data through a second path different from the first path when the first determining means determines that the predetermined time period has passed from the output end timing; and second output means for outputting sound based on the sound data output through the second path by the second control means.

BRIEF DESCRIPTION OF THE DRAWINGS

FIG. 1A is a diagram showing the front external appearance of a handy terminal 100, 200, 300 open according to one embodiment of the invention;

FIG. 1B is an external view showing the right side of the handy terminal 100;

DETAILED DESCRIPTION OF THE PREFERRED EMBODIMENTS

Figure 2:
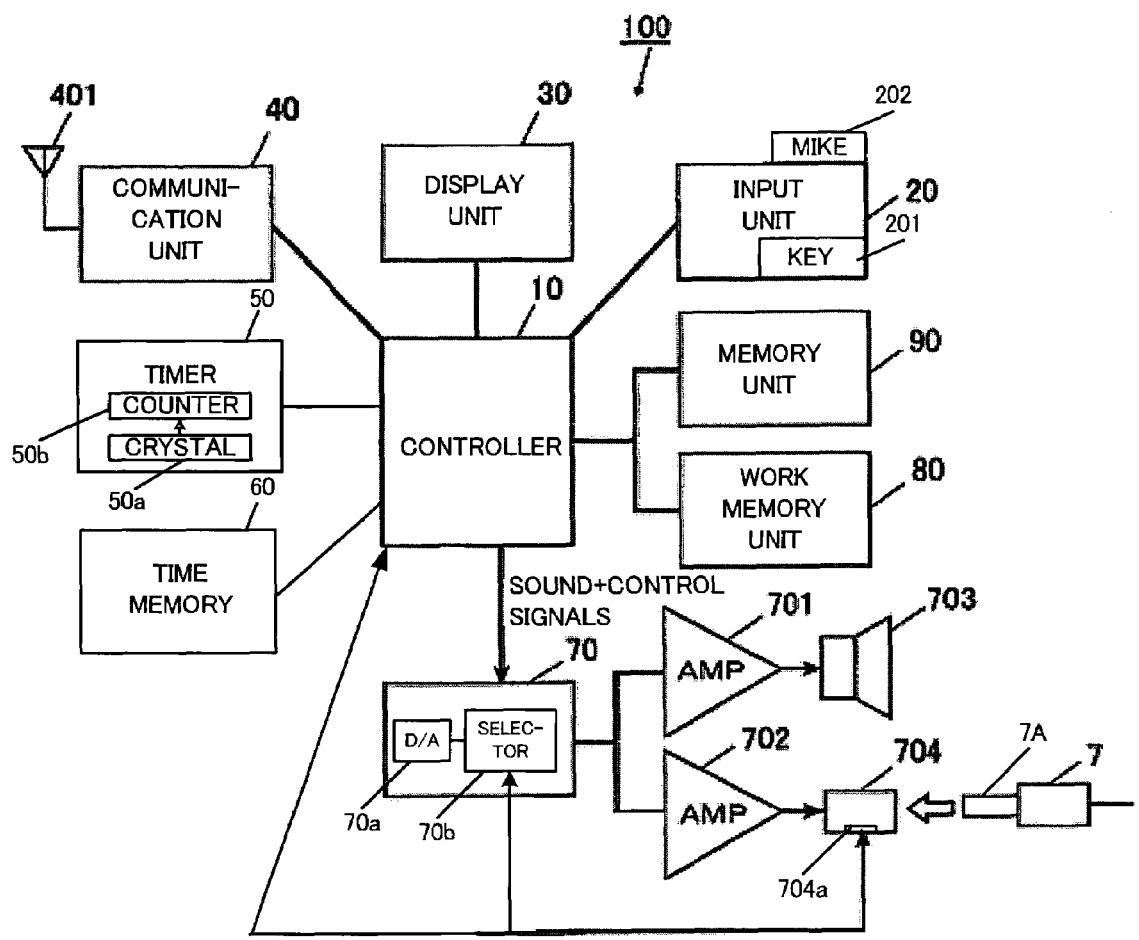
FIG. 2 is a circuit block diagram of the handy terminal 100.

Handy terminals according to preferred embodiments of the invention will be described in detail below with reference to the accompanying drawings.

First Embodiment

FIG. 1A and FIG. 1B shows the external structure of a foldable handy terminal 100 according to the embodiment. FIG. 1A is a diagram showing the front external appearance of the handy terminal 100 open, and FIG. 1B is an external view showing the right side of the handy terminal 100 open.

As shown in FIGS. 1A and 1B, the handy terminal 100 has a top cover 2 and a bottom cover 3. The top cover 2 and the bottom cover 3 are connected together by a hinge portion 4. The top cover 2 and the bottom cover 3 rotate about the hinge portion 4 to be switched between an open state as shown in FIG. 1A and a folded state where the top cover 2 and the bottom cover 3 face each other as shown in FIG. 1B.

A display panel 301 and a speaker 703 are laid out on the front side of the top cover 2. The display panel 301 comprises a liquid crystal display device, and transfers information to a user. The speaker 703 outputs a voice or a voice.

A key operation section 201 and a microphone 202 are laid out on the front side of the bottom cover 3. The key operation section 201 has a talk key 2011, an end call key 2012, and other input device such as dialing key, cursor keys, and so on and inputs an operation signal in response to user operation. The microphone 202 picks-up and inputs voice signal.

As shown in FIG. 1B, a connector 704 is located at one side of the bottom cover 3.

A headphone plug 7A of a headphone (including an earphone) 7 is inserted into the connector 704.

The circuit configuration of the handy terminal 100 will be described referring to a block diagram of FIG. 2.

As shown in FIG. 2, the handy terminal 100 includes a controller 10, an input unit 20, a display unit 30, a communication unit 40, a timer or timer circuit 50, a time memory 60, an destination selector 70, a work memory unit 80, and a memory unit 90.

The input unit 20, the display unit 30, the communication unit 40, the timer 50, the time memory 60, the destination selector 70, the work memory unit 80, and the memory unit 90 are connected to the controller 10 by buses or the like.

The controller 10 comprises a CPU (Central Processing Unit) or the like.

The controller 10 runs a control program stored in the memory unit 90 to control the operation of the handy terminal 100 while using the work memory unit 80 as a work area.

For example, the controller 10 performs control relating to an ordinary handy terminal. For example, the controller 10 receives an incoming call from another telephone via the communication unit 40. Then, the controller 10 sends sound data notifying the incoming call to a headphone 7 connected to the speaker 703 or the connector 704 via the destination selector 70. Accordingly, the sound data set as a ring sound (ringing tone) is output when detecting the incoming calling.

When a user presses the talk key 2011 on the input unit 20, the controller 10 establishes connection to a calling phone. Thereafter, the controller 10 decodes voice data included in a packet received from another phone via the communication unit 40, and sends the decoded voice data to the speaker 703 or the headphone 7 via the destination selector 70. This allows the user to hear a voice from the calling phone. The controller 10 encodes and compresses a voice from a microphone 202 included in the input unit 20, and sends the voice to the calling phone via the communication unit 40. When the user presses an end call key 2012 on the input unit 20 on, the controller 10 disconnects the connection to the calling phone.

The controller 10 has a function of detecting the end of reproduction outputting (playback) of music. For example, the controller 10 detects a termination instruction from the input unit 20, and the end of reproduction outputting in a predetermined order.

The controller 10 sends the destination selector 70 a control signal designating which one of an amplifier 701 and an amplifier 702 is the output destination of a sound signal according to a detection signal (signal indicating whether the headphone plug 7A is inserted into the connector 704) from a sensor 704a provided at the connector 704 to be discussed later.

The controller 10 receives data of an e-mail via the communication unit 40, stores the data in the memory unit 90, and displays the received mail on the display unit 301. The controller 10 creates an e-mail according to an input from the input unit 20, and sends the created e-mail through the communication unit 40.

The communication unit 40 and antenna have a function as a tuner for receiving television (TV) and radio broadcast signals. The controller 10 receives, through the communication unit 40 and antenna, analog broadcast signals or digitally encoded broadcast signals of TV and radio broadcast and other broadcasted multimedia data. The controller 10 decode received signals and outputs an image on the display unit 30, and sends a sound or voice signal to the speaker 703 or the headphone 7 via the destination selector 70. As a result, broadcast multimedia data is also reproduced.

In response to an instruction from the input unit 20, the controller 10 receives sound data from another information device, and stores the sound data in the memory unit 90. The controller 10 sends sound data received from another information device or sound data read from the memory unit 90 to the speaker 703 or the headphone 7 connected to the connector 704 via the destination selector 70. Audio data is in various formats including an image-data containing format, such as AVI (Audio Video Interleave), MPEG (Moving Picture Experts Group) or WAV, and formats of MP3 (MPEG-1 Audio Layer-III) and MIDI (Musical Instrument Digital Interface).

The input unit 20 has a key operation section 201 and the microphone 202. The input unit 20 sends the controller 10 a depression signal according to the user's operation of the key operation section 201, and receives analog sound data from the microphone 202, converts it to digital sound data and supplies the digital sound data to the controller 10.

The display unit 30 has the display panel 301 exposed to outside shown in FIG. 1A, and a drive circuit 302 incorporated in the unit. The display unit 30 displays an image and text data such as telephone number and texts on the display panel 301 based on an image signal output from the controller 10.

The communication unit 40 has an antenna 401 through which the communication unit 40 performs radio communications with an external base station or another communication terminal at a predetermined frequency. The communication unit 40 modulates voice data or data of a predetermined compression and encoding format sent from the controller 10 to a data signal prescribed according to the radio communication system, and transmits the modulated voice signal/data signal prescribed to an external base station through the antenna 401. The controller 10 receives a radio signal sent from a base station via the antenna 401, demodulates the received signal to provide digital data (baseband signal), and gives the digital data to the controller 10.

The communication unit 40 has a function of a broad cast tuner and receives analog and digital broadcast signals of a frequency corresponding to a channel selected by the user, under the control of the controller 10. In this case, the communication unit 40 has an OFDM (Orthogonal Frequency Division Multiplexing) demodulator or the like to receive digital TV broadcast terrestrial signals by demodulating received OFDM modulated signals to video/voice signals.

The timer circuit 50 has a crystal oscillation circuit 50a which outputs a clock signal of a given frequency, and a counter 50b which counts the clock signals, and measures the current time. The timer circuit 50 supplies an interruption signal of a given period to the controller 10 under the control of the controller 10.

The time memory 60 stores time data in response to an instruction from the controller 10. In the first embodiment, the time memory 60 stores time data representing the reproduction output end time, i.e., the time at which the controller 10 detects the end of reproduction output of music.

The controller 10 has an alarm function of periodically comparing the time counted by the timer circuit 50 with a notification time preset in the memory unit 9, and reads and output sound data or the like stored in the memory unit 90 when both times coincide with each other.

The destination selector 70 includes a D/A converter 70a and a selector 70b. The D/A converter 70a converts a digital sound data supplied from the controller 10 to an analog sound signal.

The selector 70b outputs the analog audio signal output from the D/A converter 70a to either the amplifier 701 or the amplifier 702 according to a control signal from the controller 10.

In accordance with an detection signal from the sensor 704a, the selector 70b sends the sound signal to the amplifier 701 when the headphone plug 7A is connected to the connector 704, and sends the sound signal to the amplifier 702 when the headphone plug 7A is not connected to the connector 704. The selector 70b may change the default output destination in accordance with an instruction from the controller 10. Once the output destination is changed, the selector 70b keeps the state until there is an instruction from the controller 10 or an operation of attaching or detaching the headphone plug 7A to or from the connector 704.

The amplifier 701 is connected to the speaker 703. The amplifier 701 amplifies a sound signal by an amplification factor which allows a person several meters away from the speaker 703 to hear an output voice.

The amplifier 702 is connected to the connector 704. The amplifier 702 amplifies a sound signal by an amplification factor which allows the user to hear an output sound from the headphone 7 set on the user and connected to the connector 704. That is, with respect to sound data output from the controller 10, the energy of a sound output from the speaker 703 is larger than the energy of a sound output from the headphone 7 and reaches farther.

The plug 7A of the headphone 7 is inserted into the connector 704. The connector 704 transfers an audio signal from the amplifier 702 to the headphone 7 via the headphone plug 7A attached.

The connector 704 has the sensor 704a that detects attachment of the plug 7A and outputs the detection signal to the controller 10.

With the above-described structure, the handy terminal 100 outputs sounds from either the speaker 703 or the headphone 7 in music playback mode, talk mode, notification-sound output mode or the like.

The work memory unit 80 comprises a RAM (Random Access Memory) or the like, and serves as a work area for the controller 10.

The memory unit 90 comprises an optical/magnetic recording medium or the like, and stores various programs, setting information of the handy terminal, and music data or image data or the like. The memory unit 90 also stores a time set by an alarm clock function to be discussed later, and a predetermined time (a time until switching the sound output destination to the speaker 703 from the headphone 7) to be discussed later.

The operation of the handy terminal 100 will be explained below referring to FIGS. 3A, 3B and 4.

When the user operates the input unit 20 to instruct playback of music, for example, the controller 10 of the handy terminal 100 sequentially reads out music data stored in the memory unit 90, and supplies the music data to the destination selector 70. The destination selector 70 performs D/A (Digital to Analog) conversion of the music data to provide an analog sound signal. When the headphone 7 is not connected to the connector 704, the destination selector 70 supplies the analog sound signal to the speaker 703 via the amplifier 701. Accordingly, a sound is output from the speaker 703. When the headphone 7 is connected to the connector 704, the destination selector 70 supplies the analog sound signal to the headphone 7 via the amplifier 702 and the connector 704. Accordingly, a sound is output from the headphone 7.

Figure 3A:
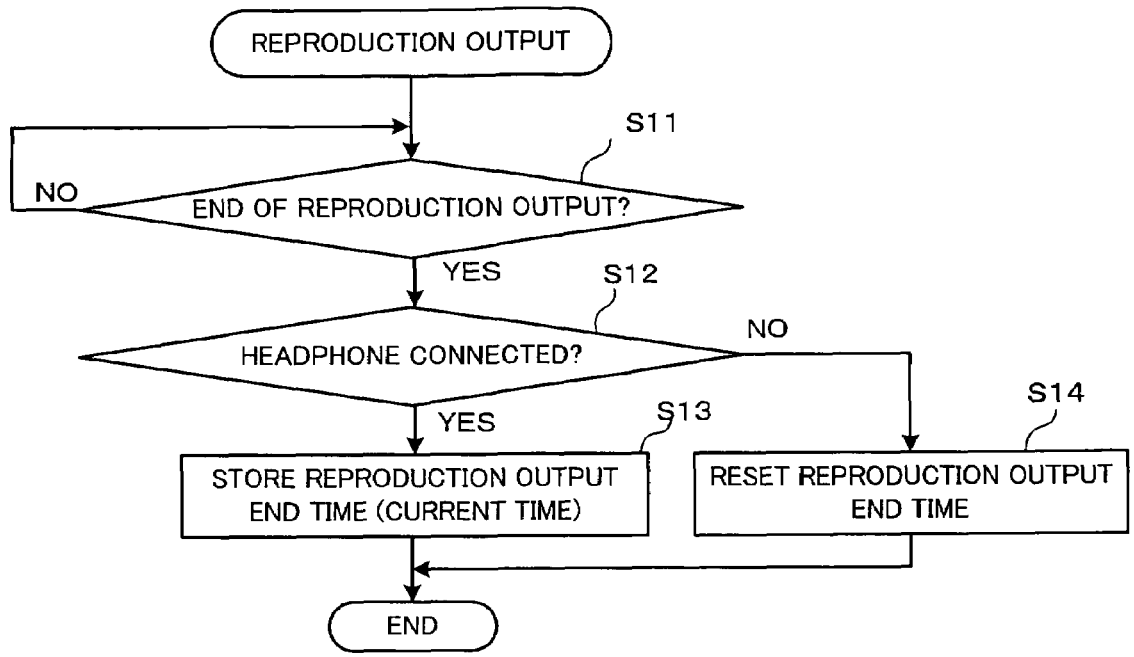
FIGS. 3A and 3B are flowcharts illustrating a process which is executed by a controller 10 of the handy terminal 100.

When the controller 10 starts reproduction outputting (playback) of music, the controller 10 invokes a process shown in FIG. 3A in parallel to the reproduction outputting.

In the process, the controller 10 stands by until the controller 10 determines that the music reproduction outputting is finished (step S11). When a stop button on the input unit 20 is operated or an event of termination of music playback in a preset order occurs, for example, the controller 10 determines that the music reproduction outputting is finished.

When determining that the music reproduction outputting is finished (step S1: YES), the controller 10 determines whether the plug 7A of the headphone 7 is connected to the connector 704 or not from the output of the sensor 704a (step S12).

When determining that the headphone plug 7A is connected to the connector 704 (step S12: YES), the controller 10 stores the current time counted by the timer 50 in the time memory 60 as a reproduction output end time (time at which music reproduction outputting is finished) (step S13). The output destination of the destination selector 70 is kept to be the amplifier 702 (output from the headphone 7).

When the headphone plug 7A is not connected to the connector 704 and a sound is output from the speaker 703 (step S12: NO), the controller 10 resets the playback end time stored in the time memory 60 (if stored therein) (step S14). The output destination of the destination selector 70 is kept to be the amplifier 701.

This completes the present music reproduction outputting process.

Thereafter, the controller 10 goes to the standby or waiting mode (reception mode).

Figure 3B:
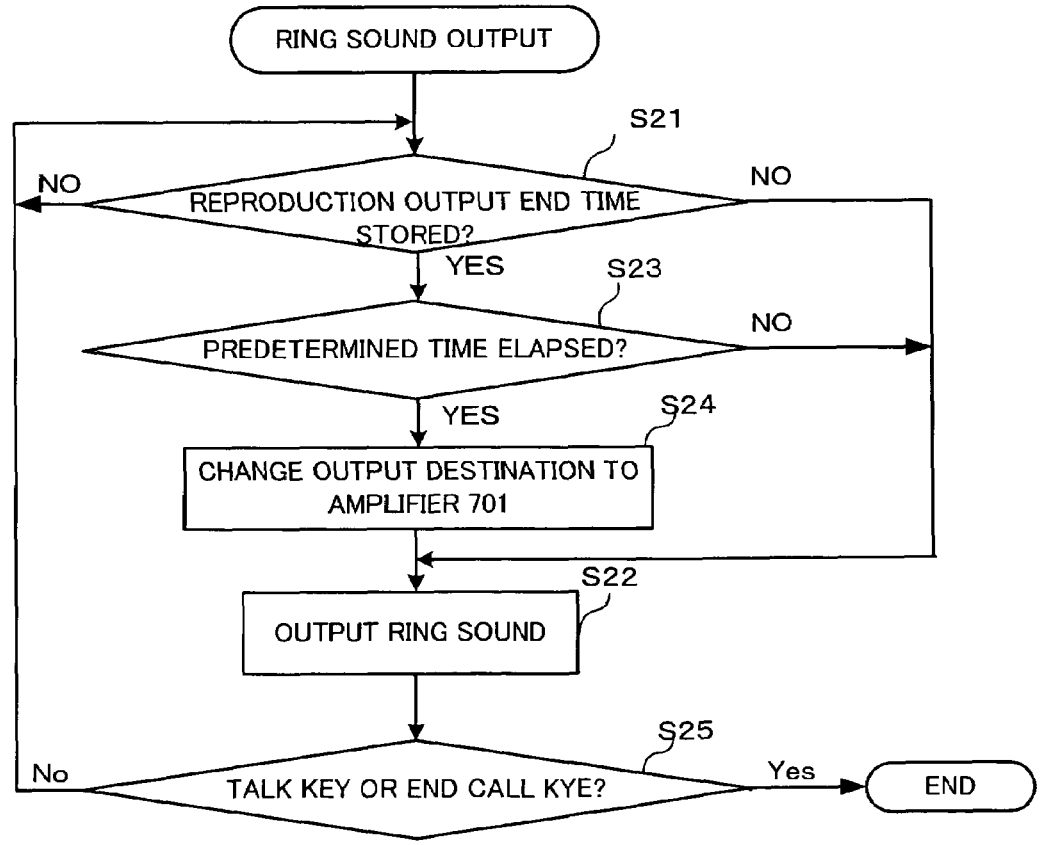

When detecting ringing (incoming call) from another phone via the communication unit 40, the controller 10 starts a ring notification process shown in FIG. 3B.

First, the controller 10 determines whether or not the reproduction output end time is stored in the time memory 60 (step S21).

When the reproduction output end time is not stored in the time memory 60 (step S21: NO), the controller 10 sends a sound signal for ring notification to the destination selector 70 (step S22). With no reproduction output end time stored in the time memory 60, the output destination of the destination selector 70 is the amplifier 701. Therefore, a ring sound is output from the speaker 703.

When the reproduction output end time is stored in the time memory 60 (step S21: YES), the controller 10 determines whether or not the current time measured by the timer 50 has passed by or more than a predetermined time prestored in the memory unit 90 from the reproduction output end time stored in the time memory 60 (step S23).

When determining that the predetermined time or a longer time elapses since the reproduction output end time (step S23: YES), the controller 10 switches the output destination of the destination selector 70 to the amplifier 701 (step S24). That is, there is possibility that a use is some distance from the handy terminal 100 with the headphone 7 attached thereto, the output destination of the destination selector 70 is changed to the amplifier 701 so that the user can hear a ring sound.

Subsequently, the controller 10 sends a sound signal for ring notification to the destination selector 70 (step S22). Therefore, a ring sound for ring notification is output from the speaker 703. This makes it possible to notify the user located some distance (e.g., several meters) away of the incoming call.

When it is determined in step S23 that the predetermined time has not yet passed since the reproduction output end time (step S23: NO), the controller 10 skips step S24 and sends a sound signal for ring notification to the destination selector 70 (step S22). In this case, the output destination of the destination selector 70 is kept to be the amplifier 702. Therefore, a sound for ring notification is output from the headphone 7.

Thereafter, the process of steps S21-S24 is repeatedly executed until the operation of the end call key 2112 or the talk key 2011 on the key operation section 201 is detected (step S25).

A ring sound is output this way. The user decides whether to talk on the handy terminal 100 or not in response to the ring sound. When the user talk on the handy terminal 100, the user depress the talk key 2011 on the input unit 20. When the user does not talk on the handy terminal 100, the user leaves the phone until the ring sound stops or depresses the end call key 2112.

Figure 4:
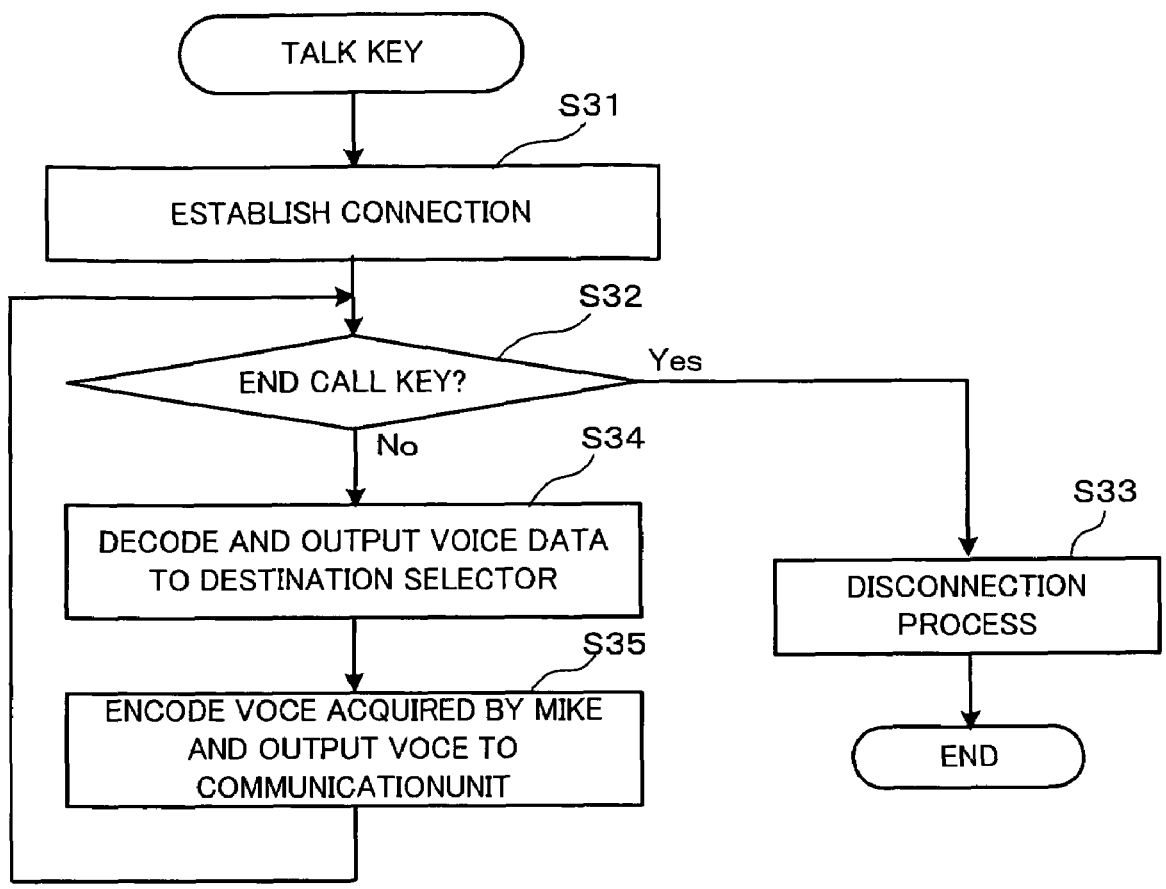
FIG. 4 is a flowchart illustrating a process which is executed by the controller 10 when the handy terminal 100 is off-hook.

When the end call key 2112 is depressed, the controller 10 initiates a process shown in FIG. 4.

First, the controller 10 establishes connection with the communication destination (the caller) (step S31).

Then, the controller 10 determines whether or not the end call key 2112 is depressed (step S32). With the end call key 2112 depressed, the controller 10 disconnects communication (step S33).

When the end call key 2112 is not depressed, the controller 10 decodes received voice data supplied from the communication unit 40, and outputs the decoded data to the destination selector 70 (step S34). As a result, the received voice is output from the speaker 703 (when the ring sound is output from the speaker 703) or output from the headphone 7 (when the ring sound is output from the headphone 7). Accordingly, the received voice is output from either the speaker 703 or the headphone (earphone) 7.

Subsequently, the controller 10 obtains voice data acquired by the microphone 202 10 and subjected to A/D conversion in the input unit 20, encodes and sends the voice data to the communication unit 40 (step S35). The communication unit 40 transmits the voice data.

As the operation is repeated, talking to the communicating telephone is carried out.

As described above, in the case the headphone 7 is connected to the handy terminal 100 when music reproduction outputting ends, the reproduction output end time data representing the timing at which music reproduction outputting ends is stored in the time memory 60. When a predetermined time or a longer time elapses from the stored reproduction output end time, the output destination of the destination selector 70 is changed in such a way that a sound is output from the speaker 703 even with the headphone 7 connected to the handy terminal 100. Thereafter, the ring sound and a talking voice is output from the speaker 703. Therefore, the user can hear a ring sound and a voice even when the user leaves behind the handy terminal 100 with the headphone 7 in use and music being reproduced.

As the predetermined time has not passed at the beginning, even with a ring sound being output from the headphone 7, that state is maintained, and when the predetermined time passes, the ring sound is output from the speaker 703.

Figure 5:
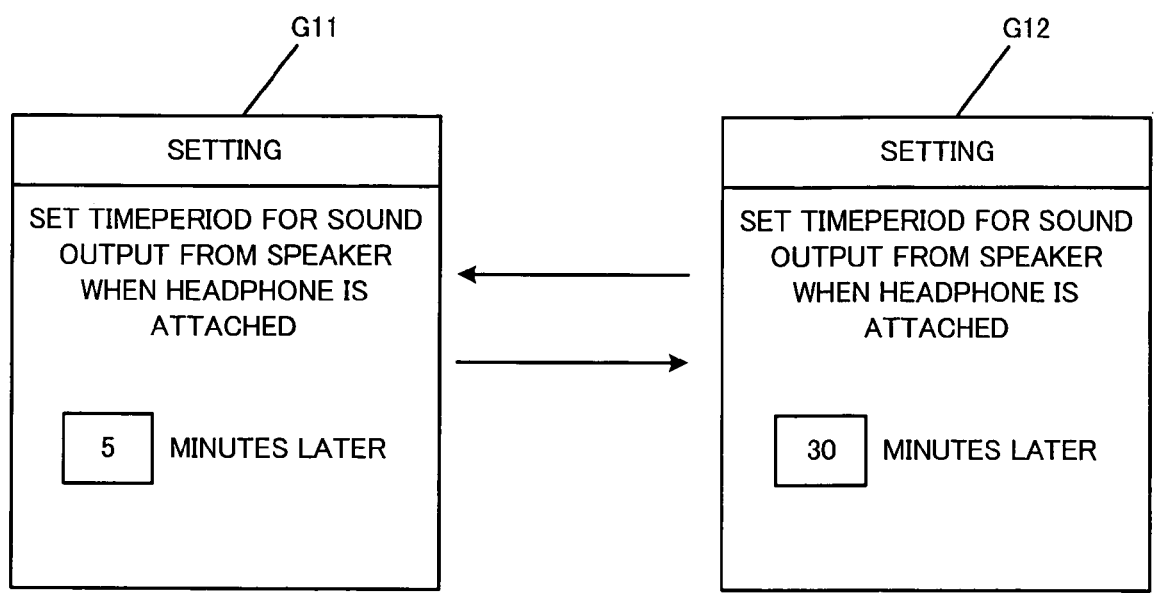
FIG. 5 is a diagram exemplifying a screen which is displayed on a display unit 30 for presetting a time until the out mode is changed to a speaker output.

The predetermined time set beforehand as a decision reference in step S23 may be made settable by the user. For instance, the controller 10 displays setting screens (screens G11, G12) as shown in FIG. 5 on the display unit 30 in response to the operation of a predetermined key on the input unit 20. Then, the controller 10 detects an instruction input from the key operation section 201 by the user referring to the screen, and updates data indicative of the predetermined time stored in the memory unit 90. In this case, a voice is output from the speaker 703 when the time desired by the user passes, so that a voice output according to the user's desirable use mode is made.

In the foregoing description, the sound data for ringing is output after the sound data of music is reproduced through the headphone 7. The multimedia data serving as the source of the sound data, file format of the sound data, a trigger for outputting the sound data and so on are arbitrary.

For example, the invention is also adaptable to a case where after sound data generated from broadcasted multimedia data is reproduced, sound data for a ring sound or an alarm sound is reproduced. The operation of the handy terminal 100 for outputting sound for notification of incoming call or alarming after an arbitrary content including sound data is reproduced, will be described referring to FIGS. 6A and 6B.

Figure 6A:
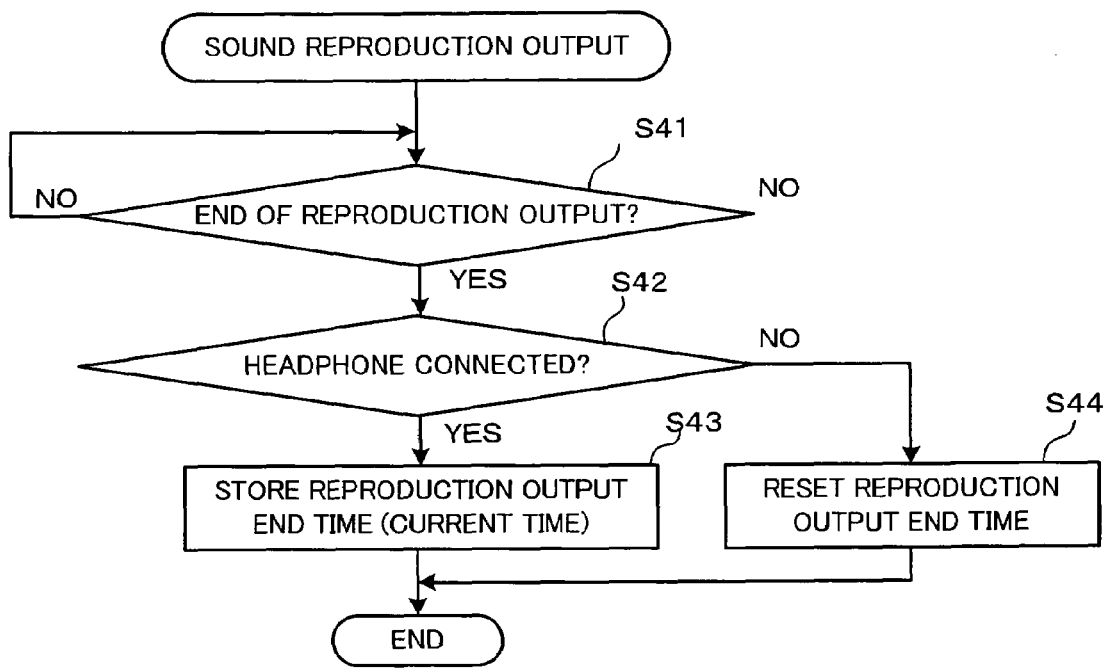
FIGS. 6A and 6B are flowcharts showing an application example of the process the controller 10 of the handy terminal 100 performs.

First, while the controller 10 executes a process for reproducing and outputting sound data included in an arbitrary content, the controller 10 executes a process shown in FIG. 6A in parallel. In the process, the controller 10 stands by until it is determined that outputting of the sound data based on the multimedia data is finished (step S41). When determining that outputting of the sound data is finished (step S41: YES), the controller 10 determines whether or not the plug 7A is connected to the connector 704 (step S42).

When the headphone plug 7A is connected to the connector 704 (step S42: YES), the current time counted by the timer 50 is stored as an output end time in the time memory 60 (step S43). The output destination of the destination selector 70 is kept to be the amplifier 702.

When the headphone plug 7A is not connected to the connector 704 (step S42: NO), on the other hand, the output end time stored in the time memory 60 is reset (step S47). The output destination of the destination selector 70 is kept to be the amplifier 701.

Figure 6B:
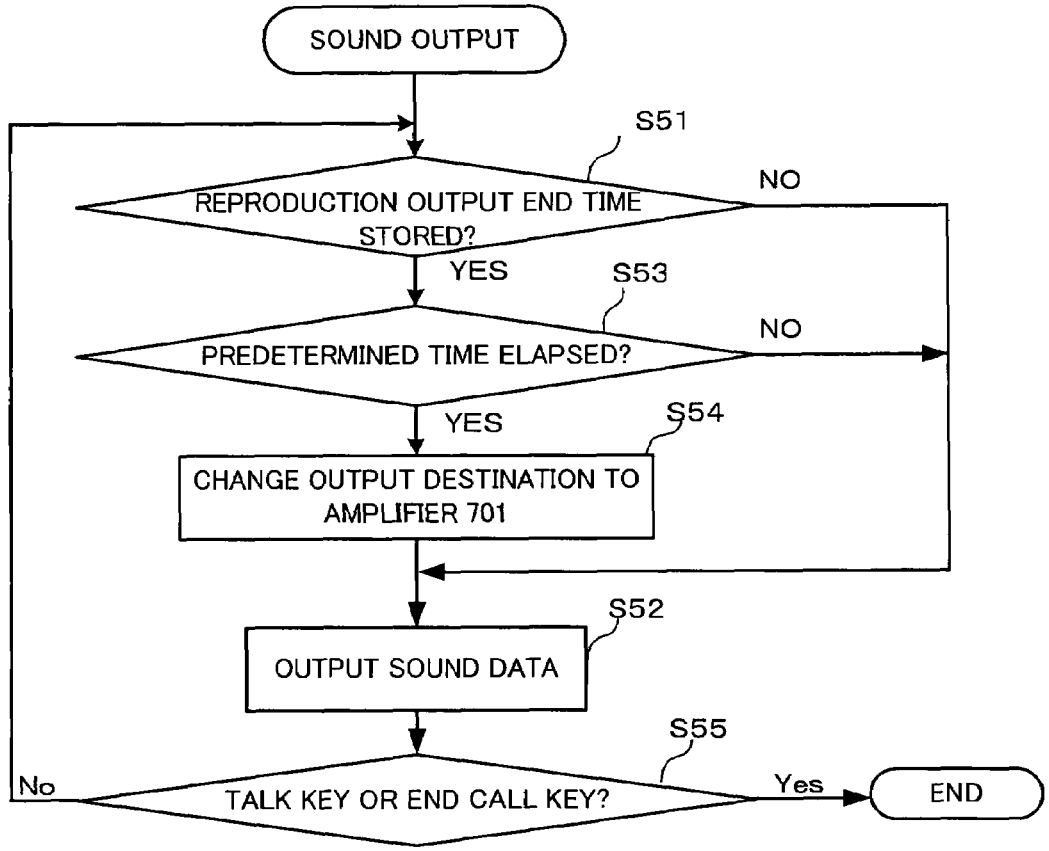

When a request for outputting sound data other than one from the input unit 20 instructed by the user, such as detection of incoming call, reception of an e-mail, or generation of the alarm sound data (when the time measured by the timer 50 matches with the notification time stored in the memory unit 90), occurs thereafter, the controller 10 initiates a process in FIG. 6B.

First, the controller 10 determines whether or not the reproduction output end time is stored in the time memory 60 (step S51).

When the reproduction output end time is not stored in the time memory 60 (step S51: NO), sound data is sent to the destination selector 70 (step S52). The destination selector 70 outputs the sound data to the speaker 703 through the amplifier 701.

When the reproduction output end time is stored in the time memory 60 (step S51: YES), the controller 10 determines whether or not the current time passes by or more than a predetermined time from the reproduction output end time stored in the time memory 60 (step S53).

When determining that the current time passes by or more than the predetermined time from the reproduction output end time stored in the time memory 60 (step S53: YES), the output destination of the destination selector 70 is changed from the amplifier 702 to the amplifier 701 (step S54). Next, the controller 10 sends sound data to the destination selector 70 (step S42). Accordingly, a sound based on the sound data is output from the speaker 703.

When it is determined in step S53 that the predetermined time has not yet passed since the stored reproduction output end time (step S53: NO), the controller 10 skips step S54 and sends sound data to the destination selector 70 (step S52). In this case, the sound is output from the headphone 7.

According to the embodiment, as described above, even when a user located away from the handy terminal 100 after arbitrary sound data is reproduced through the headphone 7, the output destination of the sound data is switched to the speaker 703 from headphone 7, when detecting, for example, an incoming call, after the predetermined time elapses. The user may hear the output sound based on the sound data.

Second Embodiment

The structure of a handy terminal 200 which is a foldable type capable of detecting the intensity of ambient light, and a process to be executed by the handy terminal 200 will be described as the second embodiment referring to FIGS. 1 and 7-9.

Those components of the second embodiment which are similar or identical to the corresponding components of the handy terminal 100 will be denoted by same reference symbols.

Figure 7:
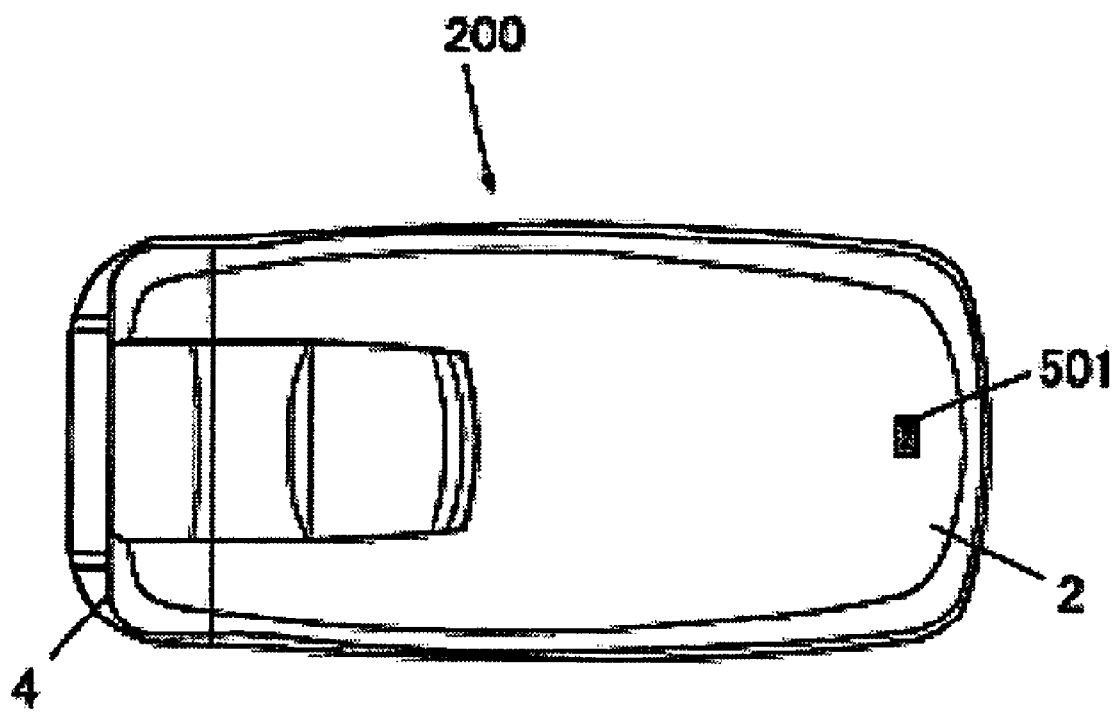
FIG. 7 is an external view of the handy terminal 200 in a folded state as seen from above a top cover 2.

As shown in FIG. 7, the handy terminal 200 has an optical sensor 501 at the outer portion of the 3 top cover 2 when folded. The optical sensor 501 detects the intensity of light (the amount of ambient light; luminance) around the handy terminal 200, and outputs a digital signal indicative of the detected intensity.

Figure 8:
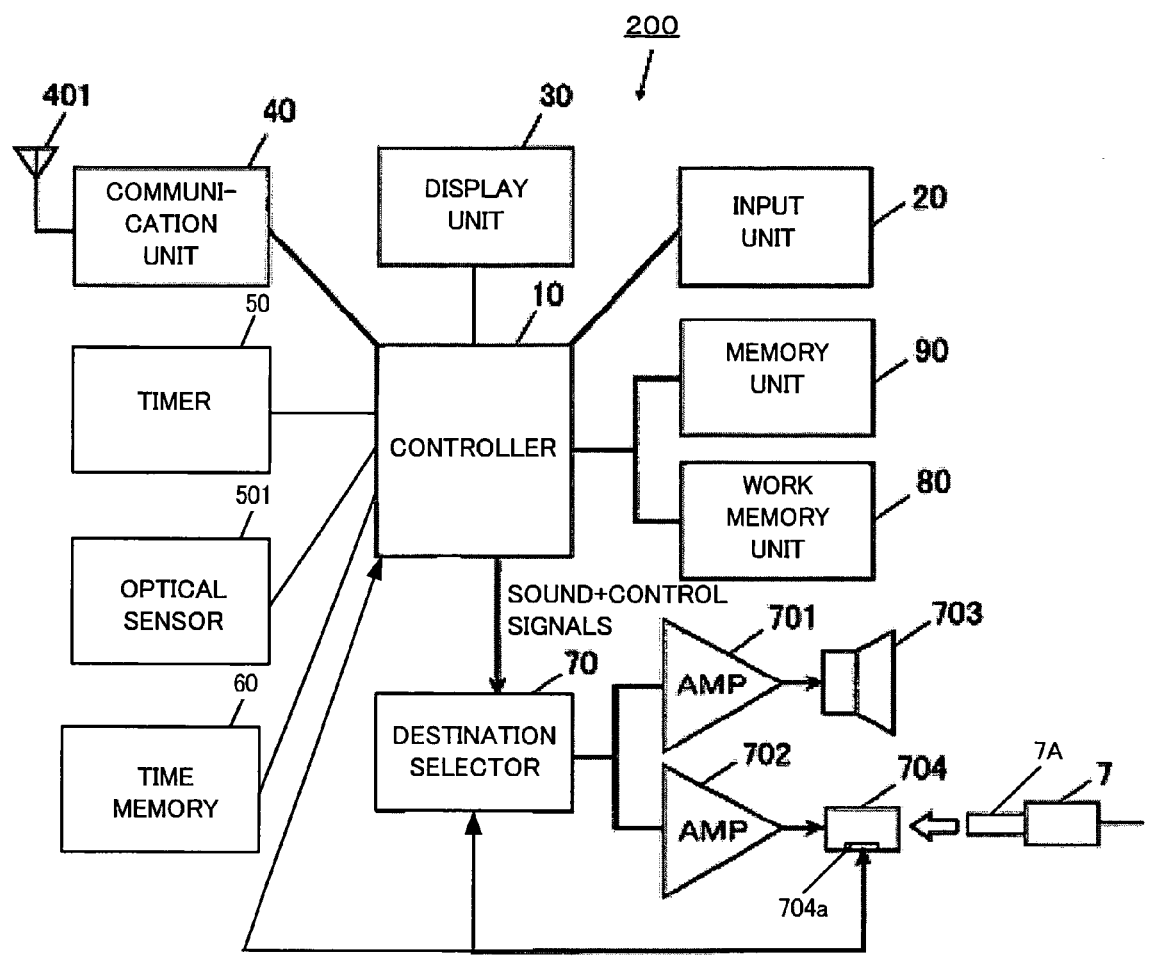
FIG. 8 is a circuit block diagram of the handy terminal 200.

The handy terminal 200 has the optical (luminance) sensor 501 in addition to the structure of the handy terminal 100 as shown in FIG. 8. In the embodiment, the time memory 60 stores the dark detection time at which the luminance detected by the optical sensor 501 is determined as to be equal to or lower than a reference level, i.e., dark.

Figure 9:
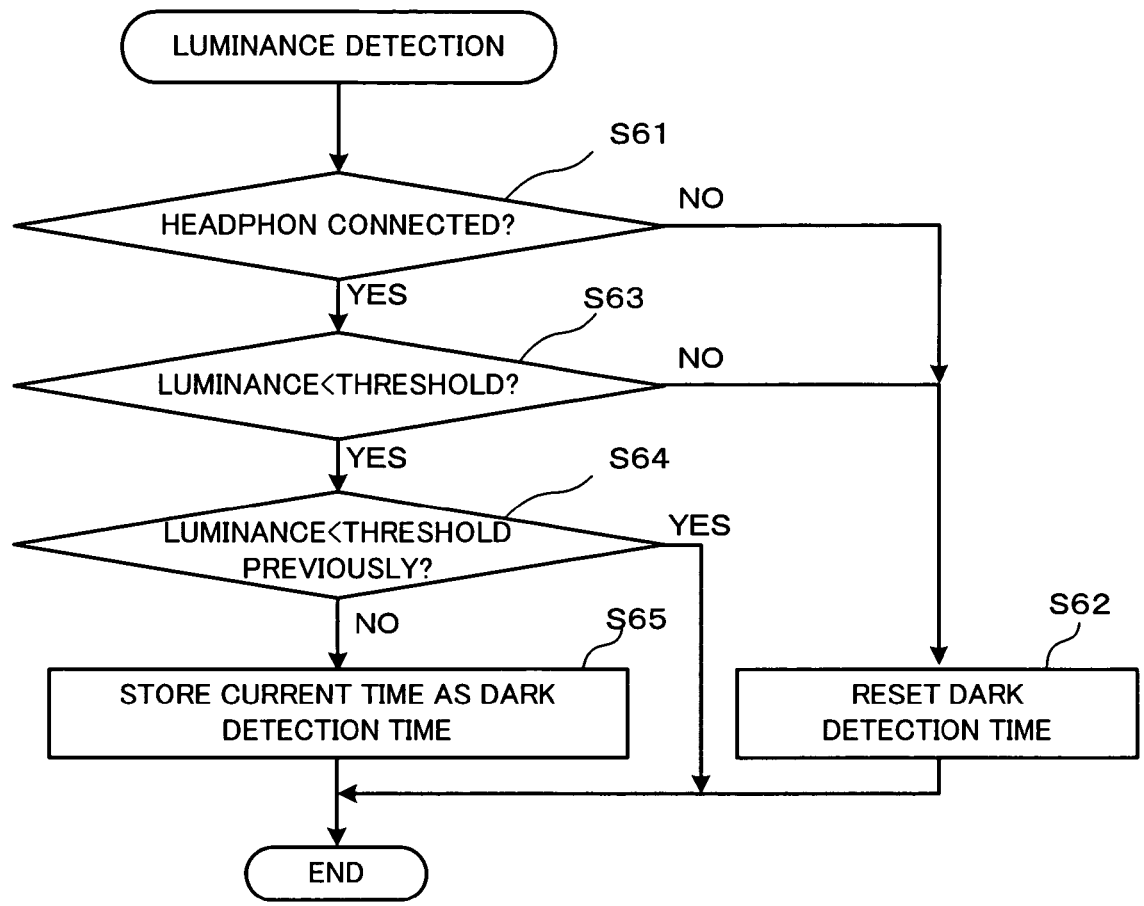
FIG. 9 is a flowchart illustrating a process which is executed by the controller 10 of the handy terminal 200.

The controller 10 of the handy terminal 200 periodically executes a luminance detection process shown in FIG. 9 by timer interruption or the like while the power supply is enabled.

When the luminance detection process starts, the controller 10 first determines whether the headphone 7 is connected to the connector 704 or not (step S61).

When the headphone 7 is not connected to the connector 704, i.e., when sound is output from the speaker 703 (step S61: NO), the dark detection time stored in the time memory 60 (if stored therein) is erased (step S62).

When it is determined in step S61 that the headphone 7 is connected to the connector 704 (step S61: YES), the luminance detected by the optical sensor 501 is compared with a preset threshold (e.g., 5 lux) to determine whether or not the detected luminance is equal to or smaller than the threshold, i.e., whether or not the handy terminal 200 is put in a dark place, and the determination result is stored in the memory unit 90 (step S63). When the luminance detected by the optical sensor 501 is determined to be equal to or smaller than the threshold (step S63: YES), it is determined whether or not the detected luminance was also equal to or lower than the threshold at the time of the previous detection based on the data stored in the memory unit 90 (step S64).

When the luminance detected by the optical sensor 501 was greater than the threshold in the previous detection (step S64: NO), the environment around the handy terminal 200 has changed from "bright" to "dark", so that the current time is stored in the time memory 60 as the dark detection time at which it is detected that the handy terminal 200 was put in a dark place (step S65).

When the luminance detected by the optical sensor 501 was also equal to or lower than the threshold in the previous detection (step S64: YES), the current process is terminated. Therefore, the dark detection time stored in the time memory 60 is kept stored therein.

When it becomes necessary to output the sound data due to ringing of the phone, reception of an e-mail, reaching at the alarm time, or the like, the controller 10 executes a process similar to the process shown in FIG. 6B.

The controller 10 determines whether or not the dark detection time is stored in the time memory 60 (step S51).

When the dark detection time is not stored in the time memory 60 (step S51: NO), the controller 10 sends sound data to the destination selector 70 (step S52). The destination selector 70 sends the analog signal to the speaker 703 via the amplifier 701.

When the dark detection time is stored in the time memory 60 (step S51: YES), the controller 10 determines whether or not the current time has passed by or more than a predetermined time prestored in the memory unit 90 from the dark detection time stored in the time memory 60 (step S53).

When determining that the predetermined time or a longer time elapses (step S53: YES), the controller 10 switches the output destination of the destination selector 70 from the amplifier 702 to the amplifier 701 (step S54). Subsequently, the controller 10 sends sound data to the destination selector 70 (step S52). Therefore, sound is output from the speaker 703.

When it is determined in step S53 that the predetermined time has not yet passed (step S53: NO), the controller 10 skips step S54 and sends a voice signal to the destination selector 70 (step S52). In this case, a voice is output from the headphone 7.

Thereafter, the process of steps S51 to S54 is repeatedly executed until the operation of the end call key 2112 or the talk key 2011 on the key operation section 201 is detected (step S55).

The operation after detection of the operation of the talk key 2011 is similar to the operation illustrated in FIG. 4.

As described above, the handy terminal 200 outputs sound from the speaker 703 when a predetermined time or a longer time elapses with the handy terminal 200 put in a dark state with the headphone 7 connected thereto. Even when the user puts the handy terminal 200 with the headphone 7 attached thereto in a dark place, for example, in a bag, therefore, the user can hear a voice from the speaker 703. In other words, the handy terminal 200 being put in a dark state implies the possibility of the handy terminal 200 being left behind. In this case, with the headphone 7 attached to the handy terminal 200, the user does not notice a ring sound if generated. In the embodiment, when a predetermined or longer time elapses after the handy terminal 200 is put in a dark state, sound is output from the speaker 703, so that the user can identify a ring sound or the like even in such a case.

As the predetermined time has not passed at the beginning, even with sound being output from the headphone 7, that state is maintained, and when the predetermined passes, a voice is output from the speaker 703.

Third Embodiment

The structure of a handy terminal 300 which is a foldable type capable of permitting external power to be supplied through a power terminal, and the operation of the handy terminal 300 will be described as the third embodiment referring to FIGS. 1 and 10-12.

Those components of the third embodiment which are similar or identical to the corresponding components of the handy terminal 100 will be denoted by same reference symbols.

Figure 10A:
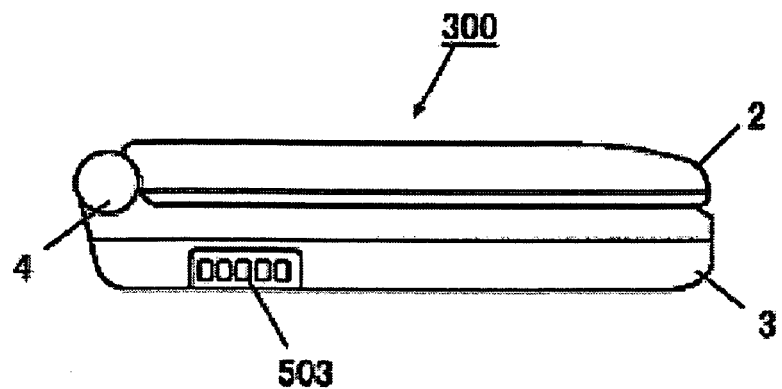
FIG. 10A is a diagram showing the external view showing the right side of the handy terminal 300 folded.
Figure 10B:
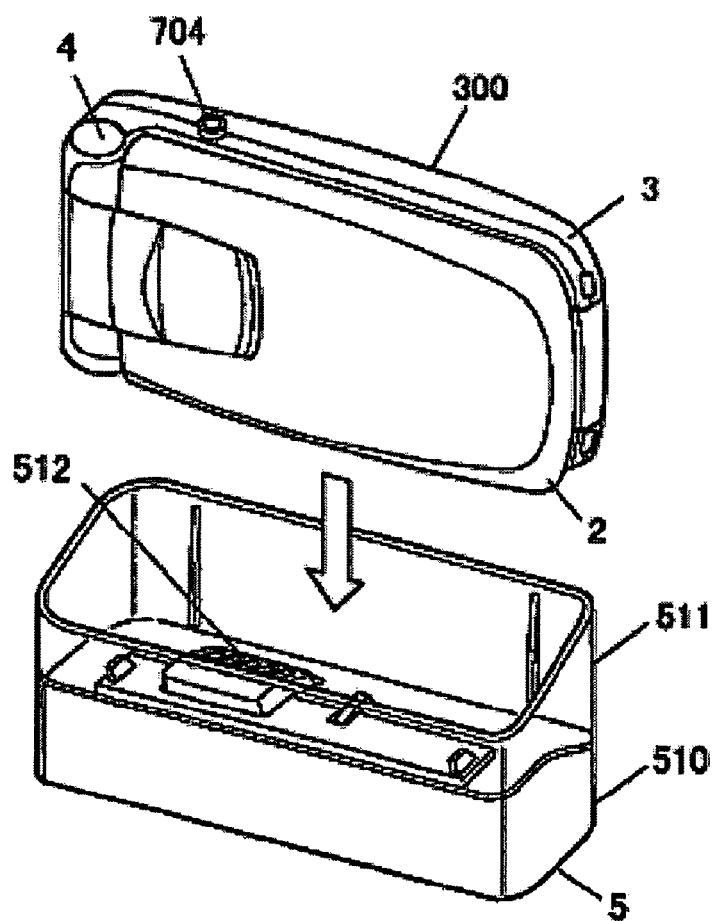
FIG. 10B is a diagram schematically showing a cradle 5 and the handy terminal 300 mounted therein.

As shown in FIG. 10A, the handy terminal 300 has a power terminal 503 at the left side of the bottom cover 3 for connection to an external power supply. Instead of the power terminal 503, a USB (Universal Serial Bus) or the like, or a terminal for enabling external data communications besides power supply to the handy terminal 300 may be used.

A cradle 5 mounts and supports the handy terminal 300. The cradle has functions for data communication between the handy terminal 300 and external apparatus, and supplying externally supplied electrical power to the handy terminal 300. The handy terminal 300 can output sound based on the reproduction of multimedia data while being mounted on the cradle 5. The cradle 5 is formed of a resin or the like, has a seating 510 and a holder 511 formed at the top portion thereof. The handy terminal 300 folded is set with its one side down in the holder 511. The seating 510 has a connection terminal 512 which contacts the power terminal 503 at the position where the handy terminal 300 is held, and a power converter which connects to a commercially available power supply, converts the supply voltage thereof to a predetermined voltage and supplies the converted voltage to the connection terminal 512.

Figure 11:
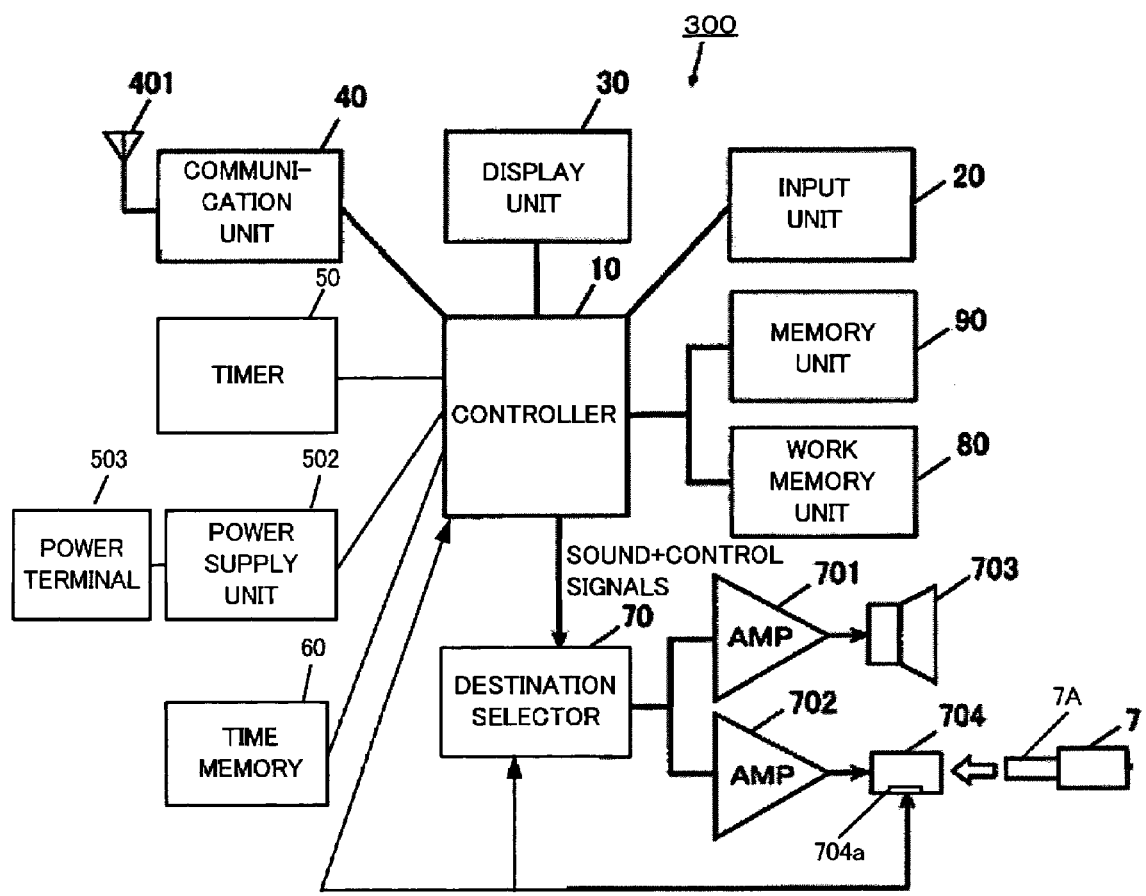
FIG. 11 is a circuit block diagram of the handy terminal 300.

The handy terminal 300 has a power supply unit 502 in addition to the structure of the handy terminal 100, as shown in FIG. 11. The power supply unit 502 has the power terminal 503 and a battery, and distributes power supplied from the battery or the power terminal 503 to the individual sections as drive power.

When supply of external power from the power terminal 503 is detected, the power supply unit 502 sends a detection signal to the controller 10, and charges the battery to full when the battery is a secondary battery. The time memory 60 stores mount time at which the handy terminal 300 is mounted on the cradle 5, the supply of the external power has started, or the handy terminal 300 is connected to an external circuit or apparatus.

The operation of the handy terminal 300 will be described referring to FIG. 12.

Figure 12:
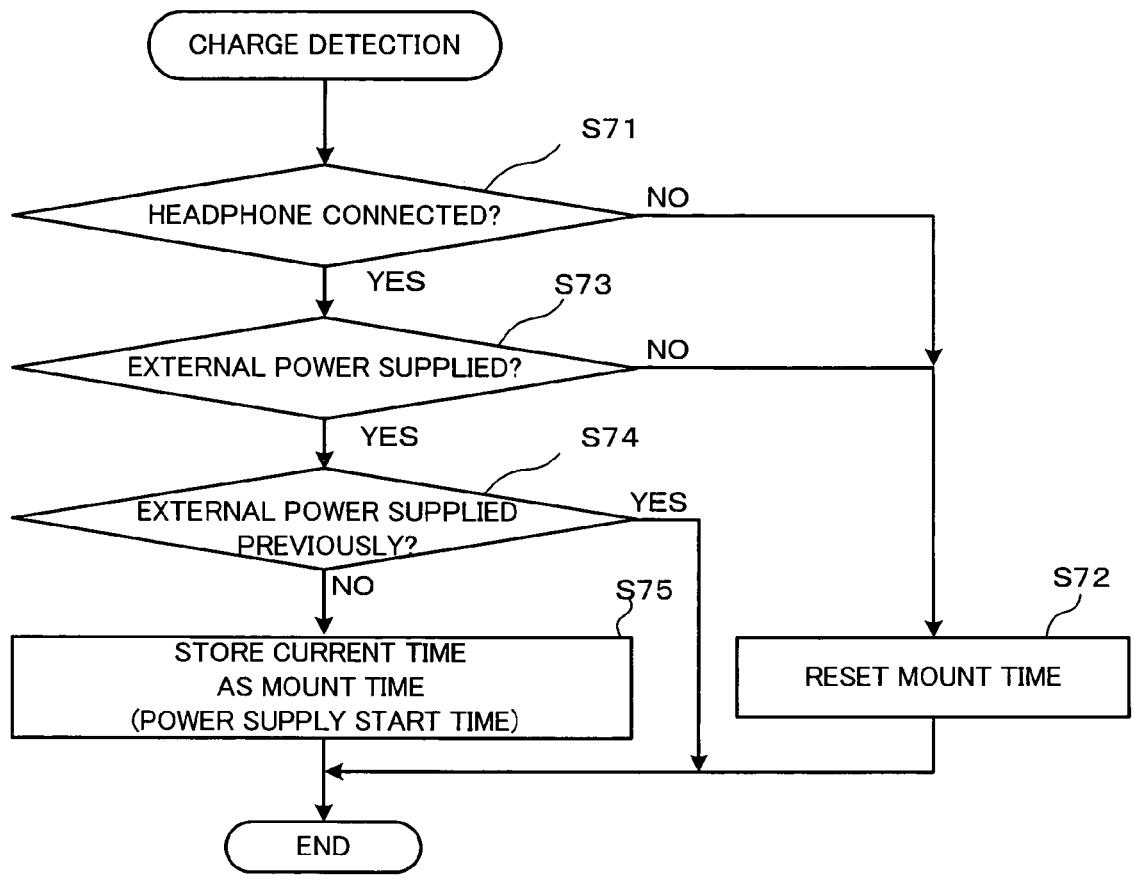
FIG. 12 is a flowchart illustrating a process which is executed by the controller 10 of the handy terminal 300.

First, the controller 10 repeatedly executes a process in FIG. 12 by timer interruption of, for example, 1-second intervals.

The controller 10 first determines whether or not the headphone 7 is connected to the connector 704 (step S71).

When the headphone 7 is not connected to the connector 704 (step S71: NO), the mount time stored in the time memory 60 (if stored therein) is erased (step S72).

When it is determined in step S71 that the headphone 7 is connected to the connector 704 (step S71: YES), it is determined based on a detection signal from the power supply unit 502 whether or not external power is supplied, and the determination result is 2 0 stored in the memory unit 90 (step S73).

When it is determined that the external power is supplied (step S73: YES), it is determined whether or not the external power was also supplied at the time of the previous detection, based on the data stored in the memory unit 90 (step S74).

When the external power was not supplied at the previous detection (step S74: NO), the current time is the timing at which the handy terminal 300 is mounted on the cradle 5 or supply of the external power has started, so that the current time measured by the timer 50 is stored in the time memory 60 as the mount time representing a timing of starting the supply of the external power (step S75).

When the power was also supplied in the previous detection (step S74: YES), the current process is terminated. The mount time stored in the time memory 60 is kept stored therein.

When it becomes necessary to output a sound due to ringing of the phone, reception of an e-mail, reaching at the alarm time, or the like, the controller 10 executes a process similar to the process shown in FIG. 6B.

In this third embodiment, the dark detection time in the process of the reproduction output end time FIG. 6B should be red as the mount time.

The controller 10 determines whether or not the mount time is stored in the time memory 60 (step S51).

When the mount time is not stored in the time memory 60 (step S51: NO), the controller 10 sends sound data to the destination selector 70 (step S52). The destination selector 70 sends the sound data to the speaker 703 via the amplifier 701.

When the mount time is stored in the time memory 60 (step S51: YES), the controller 10 determines whether or not the current time has passed by or more than a predetermined time prestored in the memory unit 90 from the mount time stored in the time memory 60 (step S53).

When determining that the predetermined time or a longer time elapses (step S53: YES), the controller 10 switches the output destination of the destination selector 70 from the amplifier 702 to the amplifier 701 (step S54). Subsequently, the controller 10 sends sound data to the destination selector 70 (step S52). Therefore, sound is output from the speaker 703.

When it is determined in step S53 that the predetermined time has not yet passed (step S53: NO), the controller 10 skips step S54 and sends the sound data to the destination selector 70 (step S52). In this case, the sound is output from the headphone 7.

Thereafter, the process of steps S51 to S54 is repeatedly executed until the operation of the end call key 2112 or the talk key 2011 is detected (step S55).

The operation after the end call key 2112 is depressed is same as shown in FIG. 4.

As described above, the handy terminal 300 outputs the sound from the speaker 703 when a predetermined time or a longer time elapses while the handy terminal 300 with the headphone 7 is charged by and mounted on the cradle 5 and when it becomes necessary to output the sound due to ringing of the phone, reception of an e-mail, arriving at the alarm time, or the like. Even when the user leaves the handy terminal 300 set in the cradle 5 with the headphone 7 attached to the handy terminal 300, therefore, the user can hear the sound output from the speaker 703.

The descriptions of the first to third embodiments merely illustrate examples of the invention, and are not limited thereto.

Although the key operation section 201 is illustrated as one example of the input unit 20, for example, various instructions may be input in voice.

Figure 13:
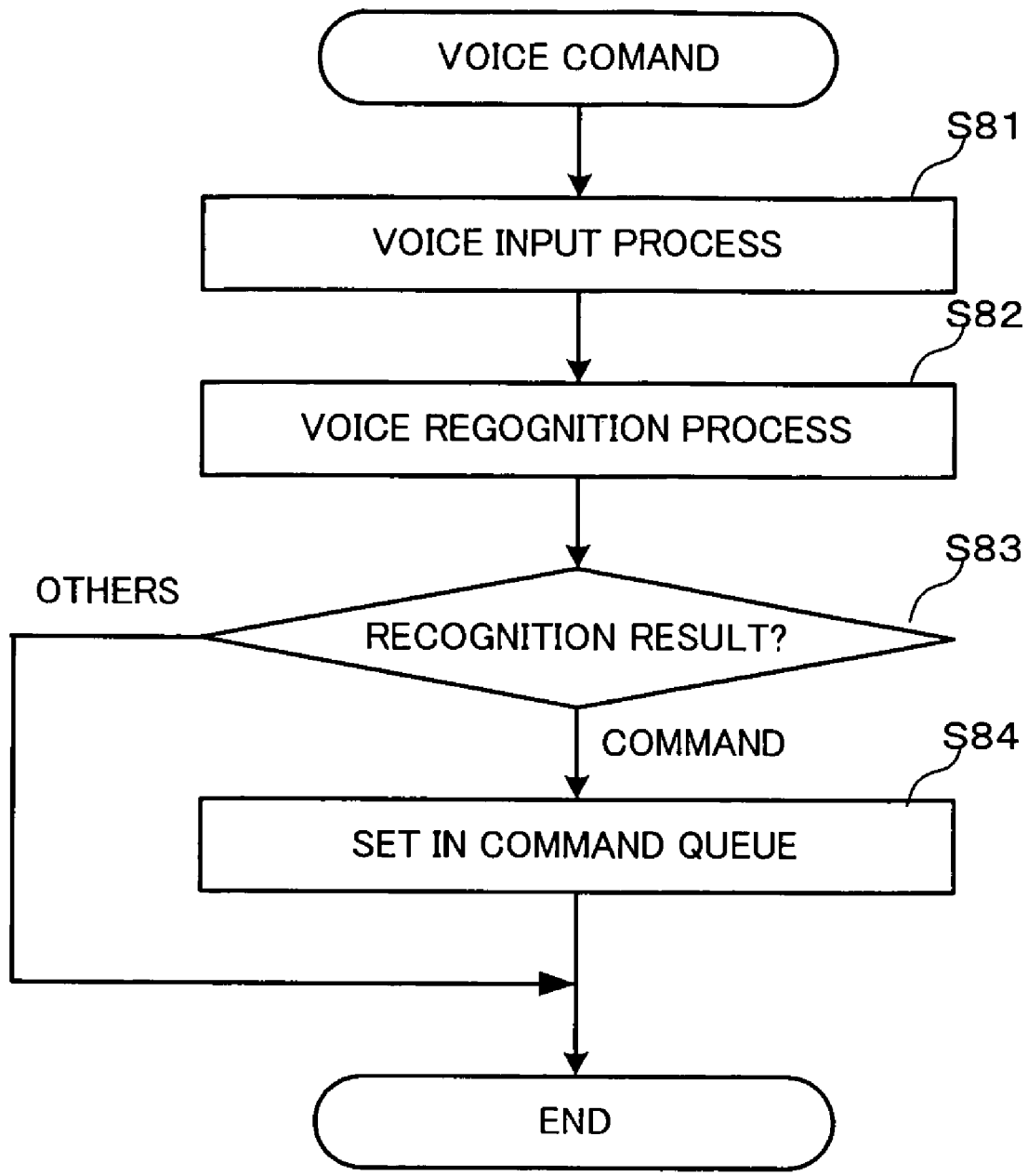
FIG. 13 is a flowchart illustrating a voice command process.
Figure 14:
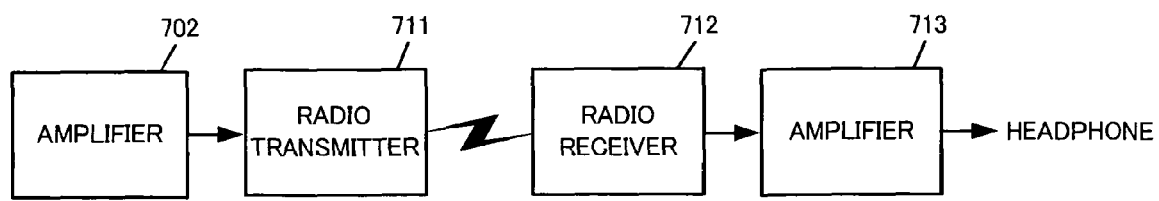
FIG. 14 is a block diagram showing an example of the connection structure of an earphone.

In this case, for example, the controller 10 executes a voice command process shown in FIG. 13 by periodic interruption while the power supply is on.

When the voice command process starts, the controller 10 acquires voice data through the microphone 202 and the input unit 20 (step S81). Then, the controller 10 executes voice recognition on the acquired voice (step S82), and determines whether a word uttered by the user corresponds to a predetermined command or not (step S83). When the word corresponds to the predetermined command, the word is set in a command queue (step S84). When the word does not correspond to the predetermined command, the process is terminated.

The controller 10 sequentially acquires and executes commands set in the command queue in another process.

With the structure, when the user is apart from the handy terminal 100 (200, 300) with the headphone 7 attached thereto, the user can control the handy terminal 100 to start connection and communication process by generates some kind of voices (voice commands). After that, a conversation with a third party can be carried out using the speaker 703 and the microphone 202.

In the embodiments, to detect that the user apart from the handy terminal with the headphone 7 kept attached thereto, the end of reproduction output of sound data due to the reproduction of the multimedia data, the darkness around the handy terminal, and whether or not charging is started are discriminated. The scheme of the determining is not limited to this particular method, but is arbitrary.

The invention is not limited to a foldable handy terminal, but is applicable to a TV, a radio, a music player and so forth. That is, the invention is applicable to a variety of apparatuses which can output an arbitrary voice from the speaker or the headphone.

Although initiation of the supply of external power when the handy terminal is put in a dark place is taken as a condition for considering the handy terminal being left behind in the second and third embodiments, both putting the handy terminal in a dark place and the end of playback of a content, or both the supply of external power to the handy terminal and the end of playback of a content may be taken as a condition for considering the cellular phone being left behind.

Although the descriptions of the embodiments have been given of a case where the headphone 7 is physically connected to the connector 704, the invention is not limited to this case. For example, a radio transmitter 711 which radio-transmits the output of the amplifier 702 may be provided to transmit a signal to a radio receiver 712 equipped in the headphone 7 by near field communication, such as Bluetooth, and the signal received by the radio receiver 712 is amplified by an amplifier 13 and then reproduced from the headphone.

Although the descriptions of the embodiments have been given of a case where the speaker 703 and the headphone 7 are used, the invention can be adapted to, for example, an apparatus which uses a plurality of voice output apparatuses, such as a plurality of speakers with different output volumes (output energies).

In the first to third embodiments, when the input unit 201 outputs an operation signal, the user is not away from the handy terminals 100, 200, and 300. With this point of view, when the input unit 201 outputs the operation signal, the controller 10 may erase or reset the time (reproduction output end time, dark detection time, and/or mount time) stored in the time memory 60 the same as the process in the step S14 in FIG. 3A, step S44 in FIG. 6A, step S62 in FIG. 9 and step S72 in FIG. 12. In this case, the controller 10 also switches the output destination from the headphone 7 (amplifier 702) to the speaker 703 (the amplifier 701) in step S23 in FIG. 3B, step S53 and so on, when it determines that the predetermined time period or more elapses from the time stored in the time memory 60 in the step S14 in FIG. 3A, step S44 in FIG. 6A, step S62 in FIG. 9 and step S72 in FIG. 12. In other words, when the input unit 201 is not operated during the predetermined time period or more from the time stored in the time memory 60 in the step S14 in FIG. 3A, step S44 in FIG. 6A, step S62 in FIG. 9 and step S72 in FIG. 12.

In the above, the first to third embodiments are separately explained for easy understanding. It is apparent that one handy terminal may have the functions of the first to third embodiments. For example, one handy terminal may have the first function of the first embodiment in which the controller 10 switches the output destination from the headphone 7 to the speaker 703 when the predetermined time elapses from the reproduction output end time at which the reproduction output of the sound data ends while the headphone 7 is connected to the handy terminal and the second function of the second embodiment in which the controller 10 switches the output destination from the headphone 7 to the speaker 703 when the predetermined time elapses from the dark detection time at which circumferences of the handy terminals became dark while the headphone 7 was connected to the handy terminal.

Similarly, one handy terminal may have the second function and the third function in which the controller 10 switches the output destination from the headphone 7 to the speaker 703 when the predetermined time elapses from the mount time at which the handy terminal is mounted on the cradle 5 by which the handy terminal is connected to the external power supply circuit and is started to be charged while the headphone 7 is connected to the handy terminal.

Similarly, one handy terminal may have the third and first functions, and the first to third functions.

In the embodiments, the amplifier 701 for the speaker 703 and the amplifier 702 for the headphone 7 are provided. In stead of the two amplifiers, one amplifier having gain control function may be used. In this case, the sound data output from the destination selector 70 is supplied to the amplifier. The output of the amplifier are switchingly supplied to the speaker 703 or the connector 704. The amplification factor (gain) of the amplifier is controlled, for example, by the controller 10 so that the speaker 703 and the headphone 7 output sound with an adequate volume.

A program which allows a computer (particularly, a processor) to perform the above-described processes may be stored in a recording medium or the like, distributed in this form, and installed on the computer to be run to perform the above-described operations.

This application is based on Japanese Patent Application No. 2005-161105 filed on Jun. 1, 2005 and including specification, claims, drawings and summary. The disclosures of the above Japanese Patent Application are incorporated herein by reference in their entirety.

What is claimed is:

1. A sound output apparatus comprising:
a sound data storing section which stores sound data;
a reading section which reads out the sound data from the sound data storing section;
an operating section which is operable by a user, detects the user's operation and outputs an operation signal;
a first control section which controls the reading section to read out the sound data from the sound data storing section and to output the read sound data through a predetermined first path, in response to the operation signal;
a first output section which outputs sound based on the read sound data supplied through the first path;
an end-timing memorizing section which memorizes timing data representing a timing at which the output of the sound data by the first control section ends;
a first determining section which determines whether or not a predetermined time period has passed from the output end timing;
a second control section which controls the reading section to read out the sound data from the sound data storing section and outputs the read sound data through a predetermined second path different from the first path when the first determining section determines that the predetermined time period has passed; and
a second output section which outputs sound based on the sound data supplied through the second path.

2. The sound output apparatus according to claim 1, further comprising:
an amplifying section which amplifies the sound data;
a second determining section which determines whether the sound data is to be output by the first control section or the second control section; and
an amplifying control section which controls an amplifying factor of the amplifying section based on the determination of the second determining section.

3. The sound output apparatus according to claim 2, further comprising a light detecting section which detects an intensity of ambient light of this sound output apparatus, wherein the second determining section determines whether the sound data is to be output by the first control section or the second control section, based on the light detecting section.

4. The sound output apparatus according to claim 2, further comprising a connection detecting section which detects connection between this sound output apparatus and an external apparatus, wherein the second determining section determines that the sound data is to be output by the second control section when the connection detecting section detects that this sound output apparatus is connected to the external apparatus.

5. The sound output apparatus according to claim 2, further comprising a call detecting section which detects an incoming call from an external apparatus, wherein the second determining section determines that the sound data is to be output by the second control section when the call detecting section detects the incoming call.

6. The sound output apparatus according to claim 5, further comprising
a response detecting section which detects a predetermined response to the incoming call detected by the call detecting section, and
a stop control section which stops the reading section reading the sound data from the sound data storing section.

7. The sound output apparatus according to claim 6, further comprising
a voice input section which inputs voice signal, and
a comparing section which compares information based on the input voice signal with preset information,
wherein the stop control section stops the reading section reading the sound data from the sound data storing section based on the comparison result of the comparing section.

8. The sound output apparatus according to claim 5, further comprising
a response detecting section which detects a predetermined response to the incoming call detected by the detecting section, a receiving section which receives data following to the incoming call when the response detecting section detects the response, and a third control section which controls the second output section to output voice based on the signal received by the receiving section.

9. The sound output apparatus according to claim 1, further comprising an editing section which edits the predetermined time period to be use in determination by the first determination section.

10. The sound output apparatus according to claim 1, wherein, the first determining section determines whether or not the operating section outputs the operation signal during the predetermined time period from the output end timing; and the second control section controls the reading section to read out the sound data from the sound data storing section and to output the read sound data through the second path when the first determining section determines that the operating section did not output the operation signal during the predetermined time period from the output end timing.

11. A sound output method comprising:

a sound data storing step of storing sound data;

a reading step of reading out the sound data stored in the sound data storing step;

a first control step of controlling the sound data read out in the reading step so as to be output through a predetermined first path in response to the operation signal output from an operation section;

a first output step of outputting sound based on the sound data output in the first control step;

a memorizing step of memorizing a timing at which the output of the sound data by the first output step ends;

a first determining step of determining whether or not a predetermined time period has passed from the output end timing;

a second control step of controlling the sound data read out in the reading step so as to be output through a predetermined second path other than the first path when the first determining step determines that the predetermined time period has passed from the output end timing.

12. The sound output method according to claim 11, further comprising:

an amplifying step of amplifying the sound data;

a second determining step of determining whether the sound data is to be output in the first control step or the second control step; and an amplifying control step of controlling the amplifying factor of the amplification in the amplifying step based on the determination of the second determining step.

13. The sound output method according to claim 12, further comprising:

a light detecting step of detecting an intensity of ambient light, wherein the second determining step determines whether the sound data is to be output by the first control step or the second control step, based on the detection result in the light detecting step.

14. The sound output method according to claim 12, further comprising:

a connection detecting step of detecting connection to an external apparatus, wherein the second determining step determines that the sound data is to be output in the second control step when the connection to the external apparatus is detected in the connection detecting step.

15. The sound output method according to claim 11, further comprising:

a call detecting step of detecting an incoming call from an external apparatus, wherein the second determining step determines that the sound data is to be output in the second control step when the connection detecting step detects the incoming call.

16. The sound output method according to claim 15, further comprising a response detecting step of detecting a predetermined response to the incoming call detected in the call detecting step, and a stop control step of stopping the reading step reading out the sound data.

17. The sound output method according to claim 16, further comprising a voice input step of inputting voice signal, and a comparing step of comparing information based on the input voice signal with preset information, wherein the stop control step stops the reading of the sound data based on the comparison result.

18. The sound output method according to claim 16, further comprising a response detecting step of detecting a predetermined response to the incoming call detected in the detection step;

a receiving step of receiving data following to the incoming call when the response detecting step detects the predetermined response, and a third control step of controlling the second output step to output voice based on the signal received in the receiving step.

19. The sound output method according to claim 11, further comprising the editing step of editing the predetermined time to be use in determination in the first determination step.

20. The sound output method according to claim 11, wherein:

a first determining step determines whether or not the operation signal is output from the operation section during the predetermined time period from the output end timing; and a second control step outputs, through the second path, the sound data read out in the reading step when the first determining step determines that the operation signal was not output from the operation section during the predetermined time period from the output end timing.

21. A computer readable recording medium storing a program for controlling a computer having a first output section, a second output section, and an operation unit as:

sound data storing means for storing sound data;

reading means for reading out the sound data from the sound data storing means;

operating means for detecting user's operation and outputting an operation signal;

first control means for controlling the reading means to read out the sound data from the sound data storing means and to output the read sound data through a predetermined first path in response to the operation signal;

first output means for outputting sound base on the read out data supplied through the predetermined first path;

end-timing memorizing means which memorizes timing data representing a timing at which the output of the sound data by the first control means ends;

first determining means which determines whether or not a predetermined period has passed from the output end timing;

second control means for controlling the reading means to read out the sound data from the sound data storing means and to output the read sound data through a second path different from the first path; and second output means for outputting sound based on the sound data supplied through the second path.

22. A sound output apparatus comprising:

sound data storing means for storing sound data;

reading means for reading out the sound data from the sound data storing means;

operating means for detecting user's operation and outputting an operation signal;

first control means for controlling the reading means to read out the sound data from the sound data storing means and to output the read sound data through a predetermined first path in response to the operation signal;

first output means for outputting sound based on the read sound data supplied trough the first path;

end-timing memorizing means for memorizing timing data representing a timing at which the output of the sound data by the first output means ends;

first determining means for determining whether or not a predetermined time period has passed from the output end timing;

second control means for controlling the reading means to read out the sound data from the sound data storing means and outputting the read sound data through a second path different from the first path when the first determining means determines that the predetermined time period has passed from the output end timing; and second output means for outputting sound based on the sound data output through the second path by the second control means.

* * * * *